July 26, 1927.
A. GLAUBITZ
1,637,182
ROTOR FOR ELECTRICAL MACHINES
Filed May 17, 1926
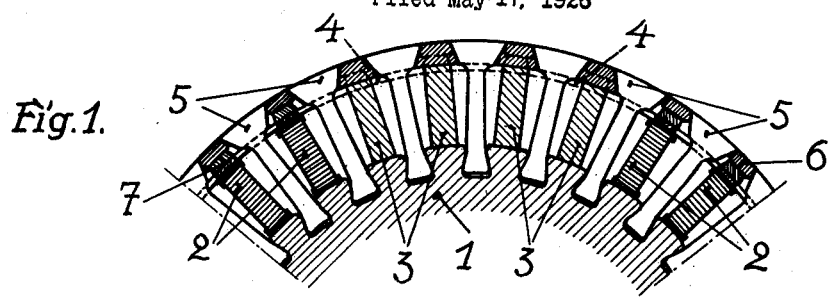
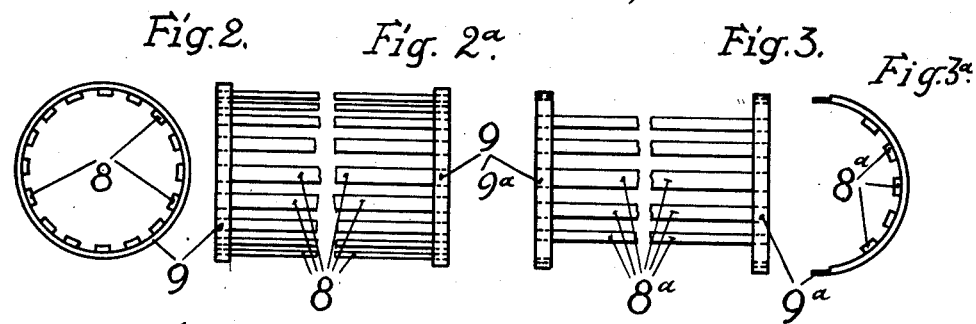
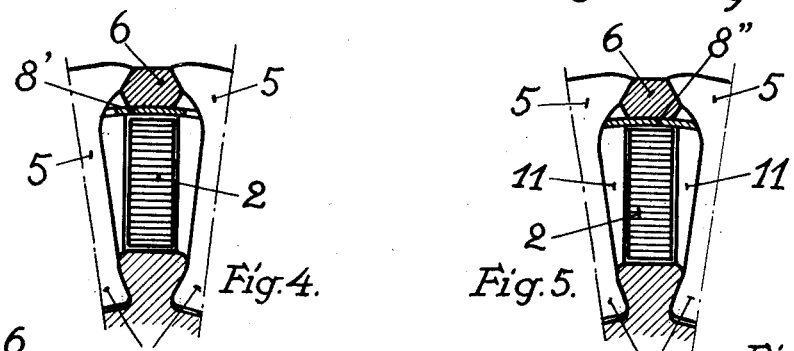
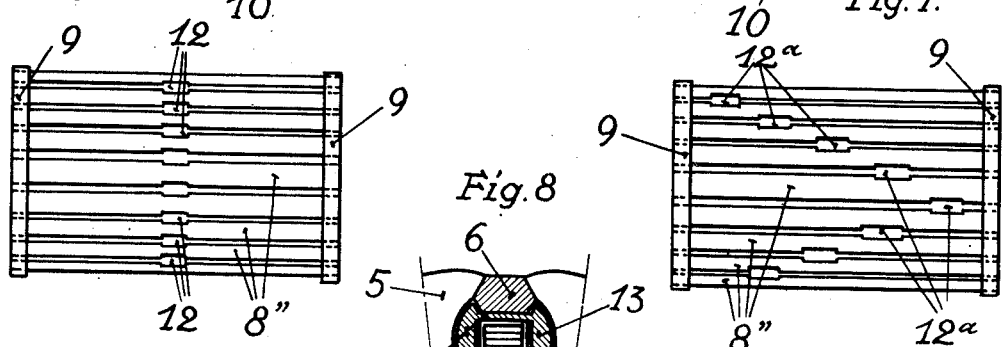
Witnesses:
Inventor:
Arthur Glaubitz Patented July 26, 1927.

1,637,182

UNITED STATES PATENT OFFICE.

ARTHUR GLAUBITZ, OF MULHEIM-RUHR, GERMANY, ASSIGNOR TO THE FIRM: THYSSEN & CO. AKTIENGESELLSCHAFT, OF MULHEIM-RUHR, GERMANY.

ROTOR FOR ELECTRICAL MACHINES.

Application filed May 17, 1926, Serial No. 109,679, and in Germany December 28, 1922.

For the safe working of electrical machines, a reliable damping-winding in the rotor of the same is of essential importance. The mounting and construction of said damping-windings is frequently met by difficulties, especially in turbo-generators, of which the rotor consists, for instance, as usual of a slotted core, coils at the circumference of the latter, pole-pieces, coil holders inserted in said core and partly enclosing said coils, and keys extending between the heads of the coil holders.

For this kind of turbo-rotors, different constructions of damping-windings have been proposed, which however have all the same drawback, namely, that the connection between the single damper parts, for instance between the damper bars and the damper rings, are made after or during the mounting of said parts in the rotor. The connections can thus be made either by soft soldering only or by mere contacts, or when using hard soldering the insulations of the rotor windings are liable to get damaged.

According to the present invention, this inconvenience is overcome by making complete damper cages or at least large parts thereof, independently from the manufacture and mounting of other rotor parts, before mounting the cages in the rotor, with best contact connections, and that directly or approximately directly in their final shape suiting the conditions of use, so that the single cage parts can receive a good contact connection by hard soldering. Said contact connection can also be omitted if the cages are punched out of well conductive sheet-metal, bent, and its free ends joined. The damper bars, or when punching the cages of sheet-metal the stays thereof not punched out, can then receive any desired breadth and even completely fill out the space between two coil holders for the coil height in the rotor, whereby the cross-section of the damper-winding is enlarged and its efficiency in respect of electric strains occurring therein is increased.

The accompanying drawing illustrates various constructional forms of the subject matter of the present invention:

Fig. 1 is a cross-section through part of the rotor showing the improved damper cage;

Figs. 2 and 2$^a$ show a damper cage in an end view and fragmentary side view respectively;

Figs. 3 and 3$^a$ show another damper cage in a fragmentary side view and end view of one half thereof respectively;

Figs. 4 and 5 show two different forms of a damper bar between coil and key;

Figs. 6 and 7 are side views of two further forms of a damper cage;

Fig. 8 shows another form of a damper bar between coil and key.

Referring to Fig. 1, the reference numeral 1 designates the slotted rotor core, 2 the coils, 3 the pole-pieces, 4 the damper cage, 5 the coil holders, 6 and 7 the keys.

As shown in Figs. 2 and 2$^a$, the damper cage consists of damper bars 8 and damper rings 9 of conductive material and of flat cross-section, the damper bars having such breadth that they do not cover the coils or cover them but little.

Figs. 3 and 3$^a$ show how a large part of the damper cage 8$^a$, 9$^a$ for instance one half thereof, can be made according to the invention.

In Fig. 4, the single damper bars 8′ between key 6 and coil 2 are of larger breadth than the latter and extend so near to the coil holders 5 that sufficient space only is left between each two adjacent bars 8′ for an insertion of the coil holder feet 10. By the broad damper bars 8′ the cross-section of the damping-winding is enlarged and its efficiency increased.

As shown in Fig. 5, the damper bars 8″ can even assume the whole available width between the coil holders, in which case recesses 12 (Fig. 6) must be provided in the bar length through which all the coil holders to be distributed over the whole bar length can be inserted with their feet 10, said recesses being either arranged in line with each other (12, Fig. 6) or in staggered position (12$^a$, Fig. 7). Said recesses 12, or 12$^a$, are so arranged that the width of one recess extends over two adjacent bars 8″, so that the latter are not much weakened at this place, the staggered position (12$^a$) being of course preferred for this same reason.

In some cases, it may also be preferable to further enlarge the cross-section of the damper-winding by thickening the edges 13 of the damper bars 8$^x$ (Fig. 8), without this requiring any change of the construction of the keys and coils, as there is sufficient space available for the purpose in question within the cooling channels 11 at both sides of the coils 2 and between the coil holders 5.

The damper cage thus prepared is so mounted in the rotor that, first, all the coils 2 are put on the rotor core 1 and, then, the finished damper cage 4, or large sections thereof as explained, are shifted over the same, whereupon the coil holders 5 are inserted row by row at the desired or required places.

If large sections of the damper cage are prepared (Fig. 3), the contact connections required for assembling these sections are so placed that the rotor windings are not endangered when soldering the same; said sections being besides so designed that their divisional planes lie parallel to the longitudinal cage axis, and that their number corresponds to the number of pole-pieces employed, so that the contact connections of said cage sections to be made when the latter are mounted in position are disposed within the winding gaps coaxial with the pole-pieces.

All the contact places of the cage, or cage sections, are either hard-soldered, riveted, or screwed.

The damper bars are insulated with reference to the rotor windings but have preferably a metallic connection with the keys 6, 7 so that the latter serve to further increase the active cross-section of the damper-winding.

What I claim, is:—

1. In a rotor for electrical machines, the combination of a slotted core, coil holders inserted in the periphery of the latter, keys extending between the heads of said coil holders, pole-pieces and coils inserted between said coil holders, and a damping-winding inserted between said keys and coils and consisting of a damper cage of which at least large sections are prepared previous to its mounting in the rotor.

2. A rotor as specified in claim 1, in which said damper cage comprises damper bars of a breadth suiting the available width between said coil holders.

3. A rotor as specified in claim 1, in which said damper cage comprises damper bars of a breadth suiting the available width between said coil holders and having recesses therein for an insertion of the feet of said coil holders.

4. A rotor as specified in claim 1, in which said damper cage comprises damper bars of a breadth suiting the available width between said coil holders and having recesses therein for an insertion of the feet of said coil holders, said recesses extending with their width over two adjacent damper bars.

5. A rotor as specified in claim 1, in which said damper cage comprises damper bars of a breadth suiting the available width between said coil holders and having recesses therein for an insertion of the feet of said coil holders, said recesses extending with their width over two adjacent damper bars and being arranged in staggered position with reference to each other.

6. A rotor as specified in claim 1, in which said damper cage comprises damper bars of a breadth suiting the available width between said coil holders, said damper bars having enlarged edges to increase their cross-section.

In testimony whereof I have hereunto set my hand.

ARTHUR GLAUBITZ.